United States Patent [19]

Ogawa

[11] Patent Number: 5,770,640
[45] Date of Patent: Jun. 23, 1998

[54] FINISHING AGENTS AND METHOD OF USING THE SAME

[75] Inventor: Kazufumi Ogawa, Nara, Japan

[73] Assignee: Matsushita Electric Industrial Co., Ltd., Osaka, Japan

[21] Appl. No.: 778,136

[22] Filed: Jan. 2, 1997

Related U.S. Application Data

[62] Division of Ser. No. 661,729, Jun. 11, 1996.

[30] Foreign Application Priority Data

Jun. 14, 1995 [JP] Japan ................................. 7-147850
Jul. 24, 1995 [JP] Japan ................................. 7-187536

[51] Int. Cl.$^6$ ........................... C08K 9/10; G09G 1/08
[52] U.S. Cl. ........................ 523/210; 524/837; 524/588; 524/858; 524/859; 524/847; 524/786; 524/788; 524/789; 524/780; 524/785; 524/730; 524/773; 252/312; 106/3; 106/10; 106/270; 106/404; 106/464; 106/481; 106/453; 106/456; 106/475; 106/287.13; 106/287.14; 106/287.16
[58] Field of Search ......................... 524/837, 588, 524/858, 859, 847, 786, 788, 789, 780, 785, 730, 773; 252/312; 523/210; 106/3, 287.16, 270, 10, 287.13, 287.14, 404, 464, 481, 453, 456, 475

[56] References Cited

U.S. PATENT DOCUMENTS

| | | | |
|---|---|---|---|
| 4,636,324 | 1/1987 | Murase et al. | 252/70 |
| 5,435,839 | 7/1995 | Ogawa | 106/10 |
| 5,532,293 | 7/1996 | Landis | 523/210 |
| 5,545,255 | 8/1996 | Ogawa | 106/272 |
| 5,547,711 | 8/1996 | Kirchmeyer et al. | 427/386 |
| 5,603,739 | 2/1997 | Neuland | 51/298 |
| 5,645,633 | 7/1997 | Ogawa | 106/287.14 |

*Primary Examiner*—Karen A. Dean
*Attorney, Agent, or Firm*—Morrison & Foerster LLP

[57] ABSTRACT

Finishing agents comprise the combination of an alkoxysilane surface active agent, a silanol condensing catalyst, and a nonaqueous liquid or solid medium, or the combination of an alkoxysilane surface active agent, an acid catalyst and a liquid or solid medium. In the latter embodiment, it is preferred that at least one of the alkoxysilane surface active agent and the acid catalyst be microencapsuled. The finishing agent permits formation of chemically adsorbed protecting films. Such protecting films are used for substrates of such equipments as electronics products, electric domestic products, automobiles, industrial equipment, mirrors, lenses for glasses and the like. The protecting films have a durability and heat, weather and abrasion resistance, and also water and oil repellent properties.

8 Claims, 1 Drawing Sheet

FINISHING AGENTS AND METHOD OF USING THE SAME

This application is a division of U.S. application Ser. No. 08/661,729 filed Jun. 11, 1996 pending.

Field of the Invention

The invention relates to finishing agents and methods of using the same. More particularly, the invention relates to finishing agents and methods for forming a durable ultra thin, water and oil repelling, chemically adsorbed protecting film on the surface of a substrate.

BACKGROUND OF THE INVENTION

Conventionally, a finishing agent has been used as a glazing agent. The finishing agents of the prior art are typically solid or emulsified, and generally comprise the mixture of a petroleum solvent, silicone, wax, or lower alcohol, with an abrasive material (e.g. Japanese Laid-Open Pat. (Tokkai-Hei) No.2-151676 and No.2-170878). Moreover, a finishing agent using a silane compound containing fluorine has also been suggested (e.g. Japanese Laid-Open Pat. (Tokkai-Hei) No.3-100060 and EP Laid-Open No. 0577951A1).

The finishing agents of the prior art have weak water repelling and lustering properties, and the protecting films of the prior art do not have suitable durability and solidity since they are merely applied to the substrate surfaces. In addition, they possess only a minor oil repelling property. According to the method suggested in Japanese Laid-Open Pat. (Tokkai-Hei) No.3-100060 or EP Laid-Open No. 0577951A1, films cannot be easily formed because the reaction of alkoxysilane surface active agent is slow. While a method using dealcohol catalyst is possible, the surface active agent cross-links with moisture in the air and lose its activity. In other words, if a finishing agent includes water, the surface active agent cross-links before reacting with the surface of a substrate so that the reaction of the surface active agent on the solid surface of the substrate is prevented, making it difficult to form a chemically adsorbed film. Moreover, if an alkoxysilane surface active agent and acid catalyst are used, it is difficult to blend both of them at the same time. Thus, the two liquids, the alkoxysilane surface active agent and the acid catalyst, must be made separately. The method of using such liquids is also difficult.

An objective of the invention is to provide a finishing agent and a method of using the same, wherein the reaction of the alkoxysilane surface active agent is promoted by using a silanol condensing catalyst, and wherein the finishing agent is efficiently and reasonably reacted to the surface of the substrate by avoiding the influence of moisture on the surface active agent. Another objective of the invention is to provide a finishing agent and a method of using the same in order to form the protecting film not only having an excellent lustering property and a water repelling property and not only applied to the surface of a substrate, but also having durability and hardness and further having water and oil repelling by chemically bonding to the surface of a substrate. In another embodiment, a protective film having excellent heat, weather and abrasion resistance is provided by applying thinly and adhesively a fluorocarbon polymer film to the substrate. The overcoat can be employed in the production of household electric goods, automobiles, industrial equipment, glass, mirrors, lenses for glasses, interior goods, apparel goods, and other household goods.

SUMMARY OF THE INVENTION

In one aspect, the present invention relates to a first finishing agent comprising an alkoxysilane surface active agent, a silanol condensing catalyst and a nonaqueous liquid or solid medium.

Preferably, the finishing agent comprises an alkoxysilane surface active agent in an amount of 0.1 to 30 wt. % (% by weight), a silanol condensing catalyst in an amount of 0.0001 to 20 wt. % and a nonaqueous liquid or solid medium in an amount of 5 to 99.8999 wt. % based on 100 wt. % of total weight of the finishing agent. Optional additives for the finishing agent include coloring agents, fillers, perfumes or the like.

The finishing agent also preferably includes an abrasive material. In this embodiment of the invention, the alkoxysilane surface active agent is preferably present in an amount of 0.1 to 30 wt. %, the silanol condensing catalyst is present in an amount of 0.0001 to 20 wt. %, the nonaqueous liquid and solid medium is present in an amount of 5 to 99.8999 wt. % and the abrasive material is present in an amount of more than 0 not more than 60 wt. % based on 100 wt. % of the total finishing agent. Optional additives for this embodiment include coloring agents, fillers, perfumes or the like.

In another aspect of this invention, at least one of the silanol condensing catalyst and the alkoxysilane surface active agent is microencapsuled. Such an arrangement minimizes or even prevents contact of these components with moisture in the air, thus, preservation time of the finishing agent is prolonged.

The silanol condensing catalyst is preferably at least one material selected from the group consisting of metal carboxylate, carboxylic acid ester salt, metal carboxylate polymer, metal carboxylate chelate, titanic ester and titanic ester chelate.

It is preferable in this invention that the moisture content is not greater than 10 ppm. If the moisture content is more than 10 ppm, strong odor of chlorine may be generated.

According to another aspect of the invention, a second finishing agent is provided. This finishing agent comprises an alkoxysilane surface active agent, a silanol condensing catalyst and a liquid or solid medium and at least one of an alkoxysilane surface active agent and a silanol condensing catalyst is microencapsuled. Furthermore, the finishing agent may include an abrasive material and/or calcium carbonate.

It is preferable in the first or second finishing agent of the invention that the viscosity of a liquid or solid medium is not less than 1000 cps (where cps represents centipoise) at 25° C. It is further preferable that the viscosity is in the range of 1000–5000 cps.

It is preferable in the finishing agent that the liquid or solid medium comprises a mixture of (i) a medium having a boiling point of 200° C. or more and (ii) a medium having a boiling point of 100°–200° C.

In this invention, if the alkoxysilane surface active agent comprises a fluorocarbon group, a finished film can have both water and oil repelling property. For such alkoxysilane surface active agents, such as $CF_3-(CF_2)_n-(R)_m-SiX_p(OA)_{3-p}$ can be used, wherein n represents 0 or an integer; R represents an alkylene, vinylene, ethynylene, arylene group or a molecular chain comprising a silicon or oxygen atom; m represents 0 or 1; X represents H atom, an alkyl, alkoxyl group or a molecular chain comprising fluoroalkyl or fluoroalkoxyl groups; A represents an alkyl group or fluoroalkyl group; and p represents 0, 1 or 2.

It is preferable in the finishing agent that the abrasive material comprises at least one component comprising particles smaller than 10 µm in diameter, which are selected from the group consisting of alumina, calcium oxide, calcium carbonate, silicon carbide, boron carbide, chromium oxide, iron oxide, synthetic diamond and fine-grain silica. It is particularly preferable that the abrasive materials have an average particle size of 0.2–3 μm.

A method of using the first finishing agent of the invention comprises the steps of applying a finishing agent comprising an alkoxysilane surface active agent, a silanol condensing catalyst and a nonaqueous liquid or solid medium to the surface of a substrate, reacting an active hydrogen of the surface of a substrate with the alkoxysilane surface active agent and the silanol condensing catalyst, and removing unreacted finishing agent from the surface of a substrate. The method can further comprise a step of washing the surface of a substrate thoroughly prior to application of the agent. The molecular film having a well-ordered molecular orientation can be formed by removing excess unreacted finishing agents from the substrate surface after reacting the active hydrogen with the alkoxysilane surface active agent and silanol condensing catalyst for sufficient period of time. Furthermore, by using a nonaqueous liquid or solid medium, the reaction between the alkoxysilane surface active agent or silanol condensing catalyst and moisture content in the air can be prevented. Consequently, the reaction between the surface of the substrate and the alkoxysilane surface active agent and the silanol condensing catalyst can be promoted.

In this method, it is preferred that at least one of the silanol condensing catalyst and alkoxysilane surface active agent be microencapsuled. It is also preferred that capsules of microencapsuled alkoxysilane surface active agent or silanol condensing catalyst be broken during application. By applying the finishing agent while breaking the capsules, the reaction on the surface of a substrate can be smoothly proceeded without being influenced by moisture in the air.

The viscosity of the liquid medium is not less than 1000 cps so that the liquid does not drop out during the application. Furthermore, it is preferable that the liquid or solid medium is a mixture comprising a medium having a boiling point of 200° C. or more and a medium having a boiling point of 100° C.–200° C., thus quickening the solidification caused by evaporation of medium during the application.

A method for using the second finishing agent of the invention comprises the steps of applying a finishing agent comprising an alkoxysilane surface active agent, an acid catalyst and a liquid or solid medium in a manner which breaks at least a portion of the microcapsules protecting at least one of the alkoxysilane surface active agent and acid catalyst, reacting the surface of a substrate with the alkoxysilane surface active agent and acid catalyst of finishing agent, and removing excess finishing agents from the surface of a substrate. The method can further comprise a step of washing the surface of a substrate well prior to application of the agent.

It is preferable in this method that the abrasive materials be added to the finishing agent and the finishing agent be applied to the surface of a substrate while polishing at least the surface of a substrate. Applying the agent while polishing the surface of a substrate can improve the effect of abrading. Furthermore, the method makes it possible to generate a reaction on the polished or treated side of the substrate. As a result, a coat having a higher durability can be preferably contained.

Metals, ceramics, glass, plastics, paper, fabric, cloth, leather or comparable materials can be used as the substrate. Where a material, such as plastic or fabric, that does not have suitable water repelling property, hydroxyl groups can be introduced onto the surface in a plasma atmosphere containing oxygen or in a corona atmosphere, thus making the surface hydrophilic. In other words, it is preferable that the surface comprises hydroxyl groups.

BRIEF DESCRIPTION OF THE DRAWING

FIG. 1 is schematic of the surface of a substrate, enlarged to a molecular level, explaining one embodiment of a surface of a substrate.

DETAILED DESCRIPTION OF THE INVENTION

Figure 1A:
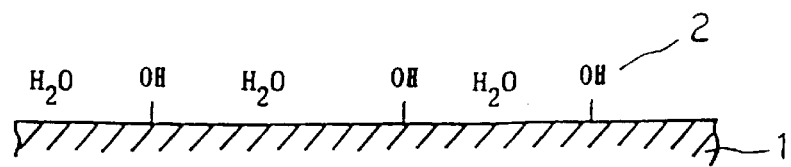
FIG. 1(a) shows the surface of a substrate before coating with the finishing agent.

According to the present invention, the first finishing agent comprises an alkoxysilane surface active agent, a silanol condensing catalyst and a nonaqueous liquid or solid medium. In addition, the silanol catalyst and/or the alkoxysilane surface active agent can be microencapsulated. Furthermore, abrasive materials can be added to the above-mentioned composition. Consequently, the reaction of the alkoxysilane surface active agent is promoted and at the same time the surface active agent is not influenced by moisture before reacting with the surface. In other words, the surface active agent can be efficiently and reasonably reacted onto the surface of the substrate. The finishing agent of this invention can be applied to the surface of a substrate in the air, since the silanol condensing catalyst and the alkoxysilane surface active agent are protected with microcapsules and/or the nonaqueous liquid or solid medium. Consequently, the finishing agents having a long preservation time can be provided. As a result, the finishing agent can be more easily used as compared to those agents in which two liquid are made separately. Moreover, according to the first finishing agents of the invention, alkoxy silane surface active agents and silanol condensing catalysts are reacted to the surface of a substrate so that alkoxysilane surface active agent can be reacted directly to the surface of a substrate and fixed thereon by covalent bonding. Consequently, the finishing agent of the present invention permits formation of a durable, ultra thin, water and oil repelling overcoat.

The alkoxysilane surface active agent for use in the first finishing agent of the invention includes agents having a formula $SiX_p(OA)_{4-p}$ (wherein X represents H, an alkyl, alkoxyl or a substituent comprising a fluoroalkyl or fluoroalkoxy group; and p represents 1, 2 or 3) can be used. In addition, alkoxysilane surface active agents having a fluorocarbon group can be employed. Such agents include those having a hydrocarbon-based molecule;

$CF_3$—$(CF_2)_n$—$(R)_m$—$SiX_p(OA)_{3-p}$, wherein n represents 0 or an integer; R represents an alkylene, vinylene, ethynylene, arylene group or a substituent comprising a silicone or oxygen atom; m represents 0 or 1; and X represents H, an alkyl, alkoxyl or a substituent comprising a fluoroalkyl or fluoroalkoxy group; A represents an alkyl or fluoroalkyl group; and p represents 0, 1 or 2.

Examples of suitable agents include:

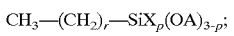

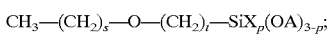

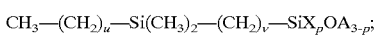

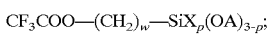

wherein r represents 1 to 25; s represents 0 to 12; t represents 1 to 20; u represents 0 to 12; v represents 1 to 20; w represents 1 to 25; X represents H, an alkyl, alkoxyl or a substituent comprising a fluoroalkyl or fluoroalkoxy group; A represents an alkyl group; and p represents 0, 1 or 2. Specific examples of the molecules include;

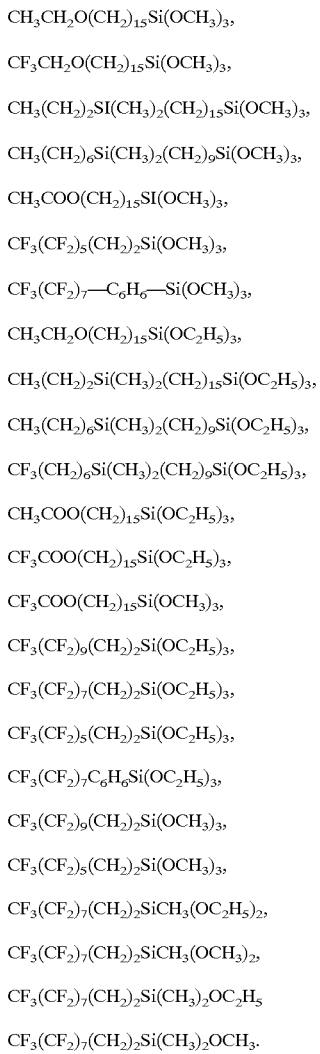

Specific examples of the silanol condensing catalyst suitable for use in the first finishing agent of the invention include metal carboxylates such as tin (I) acetate, dibutyl tin dilaurate, dibutyl tin dioctate, dibutyl tin diacetate, dioctyl tin dilaurate, dioctyl tin dioctate, diocyl tin diacetate, tin (I) dioctanate, lead naphthenate, cobalt naphtenate, iron 2-ethyl hexenoic acetate; carboxylic acid ester metal salts such as dioctyl tin bis-octyl thioglycollic acid, dioctyl tin maleic acid ester salt; metal carbosylate chelate such as dibutyl tin maleic acid polymer, dimethyl tin mercapto propionic acid salt polymer, dibutyl tin bis-acetyl acetate, dioctyl tin bis-acetyl laurate; titanic esters such as tetrabutyl titanate, tetranonyl titanate; titanic ester chelates such as bis-(acetylacetonyl) di-propyltitanate. It is preferable that above-mentioned catalysts be dissolved in nonaqueous solvent so that moisture is not included in the agents.

Moreover, any nonaqueous solvent that does not decompose surface active agents or silanol condensing catalysts can be used as the liquid or solid medium. Silicone or petroleum-based solvents are preferably used. More specifically, examples of such solvents be included; petroleum naphtha, solvent naptha, petroleum ether, petroleum benzine, isoparaffin, n-paraffin, decalin, industrial gasoline, kerosene, ligroin, dimethylsilicone, phenylsilicone, alkyl modified silicone, polyether silicone, paraffin wax, microcrystal wax, polyethylene wax, ester wax, wax oxide, and petroleum wax. The above-noted examples can be applied alone or in combinations thereof.

Moreover, if an abrasive material of particles smaller than 10 $\mu$m in diameter, such as alumina, calcium oxide, calcium carbonate, silicon carbide, boron carbide, chromium oxide, iron oxide, synthetic diamond and fine-grain silica, is included in the the finishing agent, a small amount of substrate surface would be removed during application of the agent. In this embodiment, it is preferable that the agent includes at least one alkoxysilyl group that can be directly reacted to the treated or polished surface of the substrate.

A method of using the first finishing agent of the invention comprises the following steps of washing a substrate surface thoroughly, applying a finishing agent comprising an alkoxysilane surface active agent, a silanol condensing catalyst and a nonaqueous liquid or solid medium, and reacting the alkoxysilane surface active agent to the substrate surface in the presence of silanol condensing catalysts at a room temperature. This reaction is a dealcohol condensation reaction between, for example, a hydroxyl group (—OH) of the surface of a substrate and an alkoxy group (—OR, R represents an alkyl group) at the end of alkoxysilane surface active agent molecule. A reaction time is preferably 20 to 30 minutes at a room temperature (approximately 25–30° C.). If a microencapsuled silanol condensing catalyst or alkoxysilane surface active agent is included in the agent, the preservating time, or pot life, of the finishing agent can be increased.

The finishing agent can be applied by any technique recognized in the art which will accomplish the desired function of breaking the microcapsules and/or polishing the surface of the substrate. Such techniques include rubbing with, e.g., a sponge, paper tissue, cloth or a polishing machine.

Meanwhile, according to a second finishing agent of the invention, at least one of alkoxysilane surface active agent and acid catalyst are microencapsuled and then mixed with a liquid or solid medium. Consequently, the alkoxysilane surface active agent comes in contact with the acid catalyst only when the microcapsules are broken. As a result, a finishing agent can be made by blending alkoxysilane surface active agent and acid catalyst together. A finishing agent can be more easily used, as compared to the prior art where two liquid are employed. Moreover, according to the second finishing agent of the invention, alkoxysilane surface active agent and acid catalyst are reacted to the surface of a substrate so that alkoxysilane surface active agent can be reacted directly to the surface of a substrate and fixed thereon by covalent bonding. Consequently, the second finishing agent of the invention permits formation of a durable, ultra thin, water and oil repelling overcoat.

Alkoxysilane surface active agents suitable for use in the second finishing agent of the invention include $SiB_q(OA)_{4-q}$ (wherein B represents functional group, A represents an alkyl group and q represents 1, 2 or 3). More specifically, hydrocarbon-based molecule or carbon fluoride-based compounds expressed by the following formulas can be used;

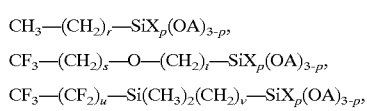

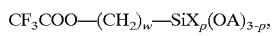

(wherein r represents 1 to 25; s represents 0 to 12; t represents 1 to 20; u represents 0 to 12; v represents 1 to 20; w represents integer of 1 to 25; X represents H, an alkyl, alkoxyl group or a substituent comprising fluoroalkyl or fluoroalkoxy groups; and p represents 0, 1 or 2);

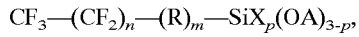

(wherein n represents 0 or an integer; R represents an alkylene, vinylene, ethynylene, arylene group or a substituent comprising a silicon or oxygen atom; m represents 0 or 1; and X represents H, an alkyl, alkoxyl or a substituent comprising a fluoroalkyl or fluoroalkoxy group; and p represents 0, 1 or 2).

Specific examples of suitable compounds include;

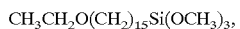

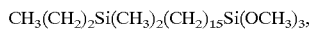

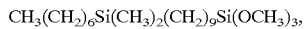

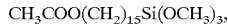

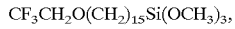

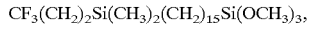

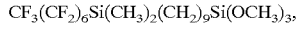

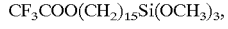

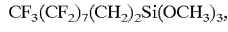

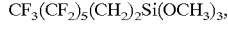

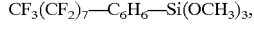

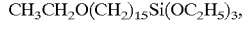

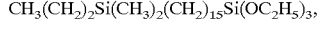

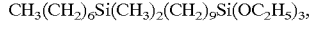

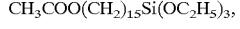

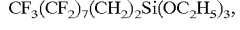

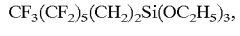

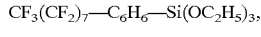

It is preferable that content of the alkoxysilane surface active agent in a finishing agent of the invention is 0.1–30% by weight.

For the acid catalyst of the second finishing agent of the present invention, organic acids such as hydrochloric acid, nitric acid, sulfuric acid, phosphoric acid, carboxyl acid and sulfonic acid can be preferably used. Moreover, organic amine compounds containing no active hydrogen can be used. The preferable amount of addition is 0.1–15 wt. %.

For the liquid or solid medium of the second finishing agent of the present invention, any solvent, of aqueous or nonaqueous type, that can disperse without breaking microcapsules can be used. It is preferable that alcohol-based solvents or petroleum-based solvents are used. Suitable solvents include butyl alcohol, isopropyl alcohol, fluid paraffin, silicone, a paraffin based wax. As such solvents, the examples include: petroleum naphtha; solvent naphtha; petroleum ether; petroleum benzine; isoparaffin; N-paraffin; decalin; industrial gasoline; kerosene; ligroin; dimethylsilicone; phenylsilicone; alkyl modified silicone; polyether silicone; paraffin wax; microcrystal wax; polyethylene wax; ester wax; wax oxide; and petroleum wax. The above-noted examples can be used alone or in combinations thereof. The preferable content of the liquid or solid medium in the finishing agent is 45–98.9 wt. %.

If the viscosity of the finishing agent is 1000 cps or above, a finishing agent does not degrade, and the handling of the agent is improved. However, if the agent is too hard, it is difficult to handle. If a liquid or a solid medium is a mixture of a medium having boiling point at 200° C. or above and medium having boiling point of 100°–200° C., the unreacted agent is simply removed so that after application, a medium component with the lower boiling point evaporates and the coating film is solidfied quickly.

Moreover, one or more abrasive material having average particle size of less than 10 μm, such as alumina, calcium oxide, calcium carbonate, silicon carbide, boron carbide, chromium oxide, iron oxide, synthetic diamond or fine-grain silica, can be added to the finishing agents. In this case, a small amount of substrate surface would be removed during the application of the agent. As a result, it is preferable that the agent including at least one microencapsuled alkoxysilyl group that can be directly reacted to the treated or polished surface of the substrate. The preferable content of the abrasive material in the second finishing agent is 1 to 50 wt. %.

The second finishing agent of the invention can also include calcium carbonate. Where a volatile acid such as hydrochloric acid or nitric acid, is used as the acid catalyst, excess volatile acid can be trapped by the reaction between volatile acid and calcium carbonate. As a result, the acid odor can be prevented by the calcium carbonate.

A method of using the second finishing agent of the invention comprises the following steps of washing the surface of a substrate throughly, applying a finishing agent to the surface of a substrate so as to break at least a portion of the microcapsules included therein, and reacting the alkoxysilane surface active agent and the acid catalyst to the substrate surface. Another method of using the second finishing agent of the invention comprises the following steps of washing the surface of a substrate thoroughly, applying a finishing agent to the surface of a substrate which applicaiton includes polishing of the substrate surface by the use of the abrasive materials in the finishing agent and while at the same time breaking at least a portion of the microcapsules in the agents, and reacting the alkoxysilane surface active agent and the acid catalyst to the surface of a substrate for a suitable period of time, preferred 20–30 minutes. This reaction by alkoxysilane surface active agent and acid catalyst to the surface of a substrate is proceeded as following.

Formula 1

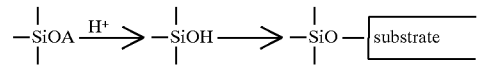

After the above-noted steps, at least the alkoxysilane surface active agent can be fixed to a substrate surface by a covalent bonding via Si atoms, thereby forming an ultra thin film.

As substrates of the invention, substrates having hydroxyl group (—OH) for examples, metals such as Al, Cu, stainless steel or the like, glass, ceramics, paper, fabric, cloth, leather or other hydrophilic substrates are preferred. In the case that a material, such as plastic, synthetic resin, and synthetic-fiber fabric, that does not have hydroxyl groups on its surface is employed, the hydroxyl groups can be introduced to the surface by a corona treatment or a plasma treatment of 100W for 20 minutes in an atmosphere containing oxygen, thereby making the surface hydrophilic. As hydrophilic groups, not only hydroxyl group (—OH) but also functional group having active hydrogen, such as —COOH, —CHO, =NH, —NH$_2$ or the like can be used. When polyamide and polyurethane resin having imino groups (—NH) used as the substrate, active hydrogen of the imino groups and alkoxyl group (—SiOA, A represents alkyl group) of the chemical adsorbent are reacted, to form siloxane bonding (—SiO—). Thus the finishing treatment is not necessary. In the case that for example, the substrate comprises nylon or polyurethane, a number of imino groups (wherein active hydrogen are contained) exposed on the surface of a substrate, chemical adsorbed film can be formed in the same manner as on glass substrate.

Consequently, this invention can be applicable for various uses and materials as described in the following;

This invention can be applicable for various uses and materials as described in the following;

(a) examples of substrates—metal, ceramics, plastic, wood, stone (the invention being applicable even when the substrate surface is coated with paint or the like in advance);

(b) examples of cutlery—kitchen and other knives, scissors, engraver, razor blade, hair clippers, saw, plane, chisel, gimlet, badkin, cutting tools, drill tip, blender blade, juicer blade, flour mill blade, lawn mower blade, punch, straw cutter, stapler, blade for can opener, surgical knife or the like;

(c) examples of needles—acupuncture needle, sewing needle, sewing-machine needle, long thick needle for making tatami, syringe needle, surgical needle, safety pin or the like;

(d) examples of products in the pottery industry—products made of pottery, glass, ceramics or enameled products, including hygienic potteries (such as a chamber pot, wash-bowl, bathtub, etc.), tableware (such as a rice bowl, plate, bowl, teacup, glass, bottle, coffee-pot, pots and pans, earthenware mortar, cup, etc.), flower vases (such as a flower bowl, flowerpot, small flower vase, etc.), chemistry apparatus (such as a beaker, reacter vessel, test tube, flask, culture dish, condenser, stirring rod, stirrer, mortar, vat, syringe), roof tile, tile, enameled tableware, enameled wash bowl, and enameled pots and pans;

(e) examples of mirrors—hand mirror, full-length mirror, bathroom mirror, washroom mirror, mirrors for automobile (back and side mirrors), half mirror, mirror for show window, mirrors for department store or the like;

(f) examples of molding parts—die for press molding, die for cast molding, die for injection molding, die for transfer molding, die for vacuum molding, die for blow forming, die for extrusion molding, die for inflation molding, die for fiber spinning, calender processing roll;

(g) examples of ornaments—watch, jewelry, pearl, sapphire, ruby, emerald, garnet, cat's-eye, diamond, topaz, bloodstone, aquamarine, turquoise, agate, marble, amethyst, cameo, opal, crystal, glass, ring, bracelet, brooch, tiepin, earrings, necklace, glasses frames (of patinum, gold, silver, aluminum, titanium, tin, compound metals of these elements, or stainless steel) or the like;

(h) examples of molds for food—cake mold, cookie mold, bread mold, chocolate mold, jelly mold, ice cream mold, oven plate, ice tray or the like;

(i) examples of cookware—pots and pans, iron pot, kettle, pot, frying pan, hot plate, net for grilling food, tool for draining off oil, plate for making takoyaki or the like;

(j) examples of paper—photogravure paper, water and oil repellent paper, paper for posters, high-quality paper for pamphlets or the like;

(k) examples of resin—polyolefin (such as polypropylene, polyethylene, etc.), polyvinylchloride, polyvinylidenechloride, polyamide, polyimide, polyamideimide, polyester, aromatic polyester, polystyrene, polysulfone, polyethersulfone, polyphenylenesulfide, phenolic resin, furan resin, urea resin, epoxide, polyurethane, silicon resin, ABS resin, methacrylic resin, ethylacrylate resin, ester resin, polyacetal, polyphenyleneoxide or the like;

(l) examples of household electric goods such as televisions, radios, tape recorders, audio goods, CD players, refrigerators, freezers, air conditioners, juicers, blenders, blades of an electric fan, lighting equipment, dial plate, hair driers or the like;

(m) examples of sporting goods—skis, fishing rod, pole for pole vault, boat, sailboat, jet skis, surfboard, golf ball, bowling ball, fishing line, fishing net, fishing float or the like;

(n) examples of vehicle parts;

(1) ABS resin—lamp cover, instrument panel, trimming parts, and protector for a motorcycle, (2) cellulose plastic—markings for automobile, and steering wheel, (3) FRP (Fiber Reinforced Plastics)—bumper, and engine cover, (4) phenolic resin—brake, (5) polyacetal—wiper, wiper gear, gas valve, carburetor parts, (6) polyamide—radiator fan, (7) polyarylate (polycondensation polymerization by bisphenol A and pseudo phthalic acid)—direction indicator lamp (or lens), cowl board lens, relay case, (8) polybutylene terephthalate—rear end, front fender, (9) poly amino-bismaleimide—engine parts, gear box, wheel, suspension drive system,

(10) methacrylate resin—lamp cover lens, meter panel and cover, and center mark,

(11) polypropylene—bumper,

(12) polyphenylene oxide—radiator grill, wheel cap,

(13) polyurethane—bumper, fender, instrument panel, and fan,

(14) unsaturated polyester resin—body, gas tank, heater housing, meter panel, (o) examples of stationary goods—fountain pen, ballpoint pen, mechanical pencil, pencil case, binder, desk, chair, book shelf, rack, telephone base, ruler, draftsman's outfit or the like;

(p) examples of building materials—roof materials (such as ceramic tile, slate, tin such as used in galvanized iron plate, etc.), outer wall materials (such as wood including processed wood, mortar, concrete, ceramic sizing, metallic sizing, brick, building stone, plastic material, metallic material including aluminum, etc.), interior materials (such as wood including processed wood, metallic material including aluminum, plastic material, paper, fabric, etc.) or the like;

(q) examples of stone materials—granite, marble or the like, used for building, building material, works of art, ornament, bath, gravestone, monument, gatepost, stone wall, sidewalk, paving stone, etc.

(r) examples of musical instruments and audio apparatus—percussion instruments, string instruments, keyboard instruments, woodwind instruments, brass instruments or the like, more specifically, drum, cymbals, violin, cello, guitar, koto, piano, flute, clarinet, shakuhachi, horn, etc., and microphone, speaker, earphone or the like.

(s) others—high voltage insulator with good water, oil and contamination repelling properties, including thermos bottles, vacuum apparatus, insulator for transmitting electricity, spark plugs or the like.

Since the fluorocarbon-based polymer film is thinly and adhesively applied to the substrate, it is easy to remove dirt on the substrate of the invention and the film has excellent heat, weather, and abrabvation resistance. Such substrate can be used for household electric goods, automobile, industrial equipment, glass, mirrors, lenses of glasses, interior goods, fiber goods, apparel goods, or the like.

The method of microencapsuling silanol condensing catalyst, alkoxysilane surface active agent, and acid catalyst is recognized in the art. See, for example, in *"New Art for Microencapsuling and Development its use and Application Examples* (1978)" published by Keiei Kaihatsu Center; and *"Microcapsule—its manufacturing method, nature, and application examples* (1977)" published by Sankyo Shuppan which are incorporated herein by reference.

The invention will be explained specifically in the following embodiments and type sectional view. In the following examples, % represents wt. %.

EXAMPLE 1

(A) Preparation of a finishing agent

| | |
|---|---|
| (1) heptadecafluorodecyl-trimethoxysilane [fluorocarbon-based alkoxysilane surface active agent: $CF_3(CF_2)_7$-$(CH_2)_2$-$Si(OCH_3)_3$] | 10 g |
| (2) n-paraffin (nonaqueous liquid medium: bp. 210° C.) | 20 g |
| (3) silicone oil (nonaqueous liquid medium: Sinetsu Kagaku Kougyou KF-96, 1000 cps) | 15 g |
| (4) paraffin (nonaqueous liquid medium: Kanto Kagaku mp 94–96° C.) | 20 g |
| (5) alpha-alumina (abrasive materials: average particle size is 1 $\mu$m) | 5 g |

The above-mentioned materials were mixed in an Erlenmeyer flask and stirred at 100° C. to make a suspension. After the suspension was cooled down to the room temperature,

| | |
|---|---|
| (6) dibutyl tin dilaurate (silanol condensing catalyst: metal carboxylate) microencapsuled by formalin condensed resin | 2 g | was added and stirred. Thus, a solid soft wax finishing agent w as provided.

At this time, dibutyl tin dilaurate was microencapsuled in a way as is suggested in the above-mentioned documents. In addition, it was found the same results were obtained when alkoxysilane surface active was microencapsuled and when both silanol condensing catalyst and alkoxysilane surface agent were microencapsuled.

(B) Application of the finishing agent

The water and oil repellent and durability of the finishing agent were examined by the following treatment.

Figure 1B:
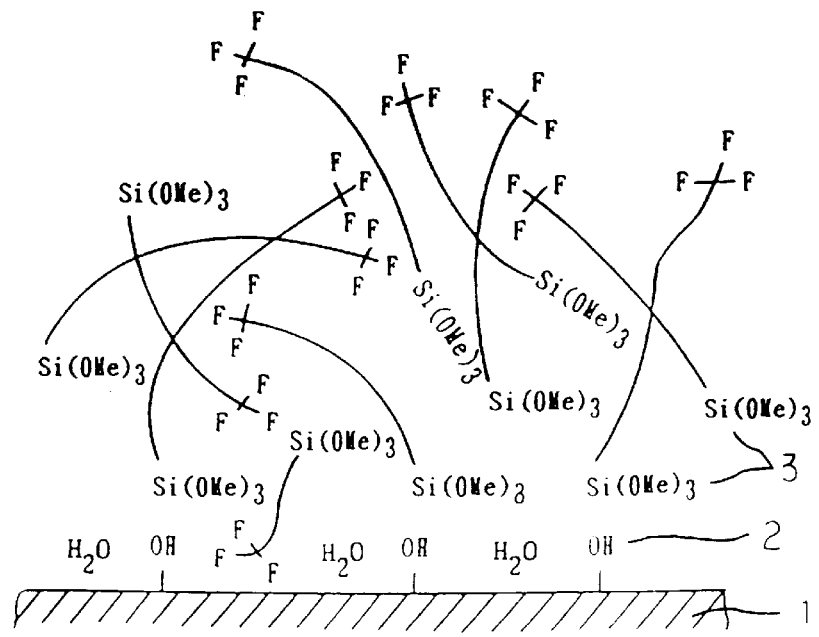
FIG. 1(b) shows the surface of a substrate right after coating with the finishing agent.
Figure 1C:
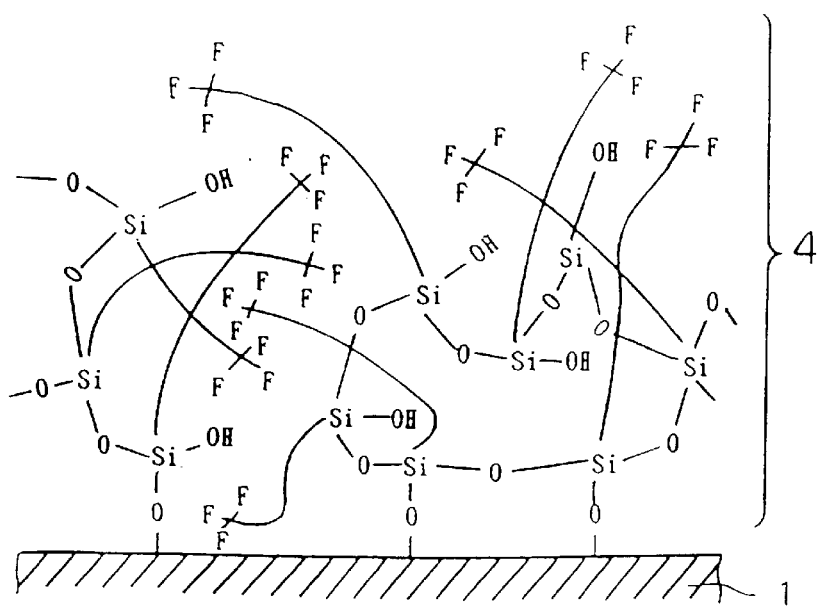
FIG. 1(c) shows the surface of a substrate on which chemical adsorbed film is formed after the reaction further proceeds.

As a substrate for the finishing agent, window glass of automobile 1 was used. The surface of this glass substrate 1 comprised a large number of —OH groups 2 containing active hydrogen (FIG. 1(*a*)).

The glass substrate was washed thoroughly and then the prepared finishing agent was applied thereon by sponge as rubbing on the surface of the glass. As a result, the capsules of formalin condensed resin were broken. Then dibutyl tin dilaurate and heptadecafluorodecyl trimethoxy silane were blended together and were in contact with the surface of the glass plate. At this time, even silicone oil and paraffin were present on the surface of overcoat and a substrate, heptadecafluorodecyl trimethoxysilane 3 came in contact with glass surface (FIG. 1(*b*)), and react to —OH group 2 on the surface of a substrate at the certain ratio in the presence of catalyst. Then glass coated by the finishing agent was allowed to sit in the air for 30–40 minutes at a room temperature (approximately 25° C.) so that n-paraffin was evaporated, thus forming white overcoat.

While moisture in the air does not reach the surface due to the nonaqueous n-paraffin. Dealcohol reaction expressed in the following Formula 2 was proceeded by the use of heptadecafluorodecyl trimethoxy silane surface active agent, moisture content adsorbed to the surface of the glass and —OH group of the surface of a substrate. As dealcohol reaction was proceeded, heptadecafluorodecyl trihydroxysilane surface active molecules were formed.

Formula 2

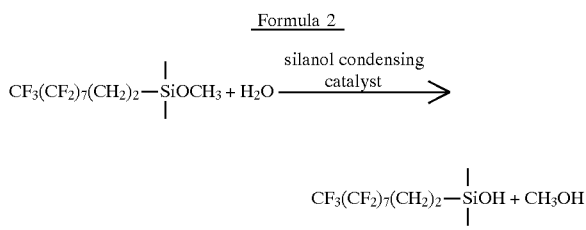

Moreover, silanol group which was made by the reaction expressed in Formula 2. and active hydrogen of —OH group generated a dehydration as expressed in Formula 3. Consequently, heptadecafluorodecyl trimethoxysilane surface active agent was chemically adsorbed and fixed to the surface of a substrate by a covalent bonding via SiO bonding.

Formula 3

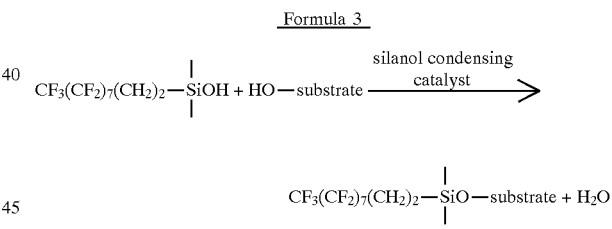

When the excess unreacted agent was wiped with a cloth, a number of heptadecafluorodecyl trimethoxysilane molecules were fixed to a substrate surface by a network bonding via SiO bonding (FIG. (*c*)). The thickness of the fluorocarbon-based chemically adsorbed film 4 was about 2–5 nm.

In this procedure, silanol condensing catalyst or alkoxysilane surface active agent is not required to be microencapsuled. However, if the silanol condensing catalyst or alkoxysilane surface active agent was microencapsuled, the preservation time could be increased.

The contact angle of water on the treated glass was 115°. The film was not peeled off by a cross-cut adhesion test. Salad oil applied on the substrate surface was easily wiped off with tissue paper. In addition, the contact angle was hardly deteriorated after being rubbed with a wet cloth 50000 times.

The results are shown in the Table 1. Moreover, if the same experiments were done by the use of the same finishing agent which had been stored for one year, the same result was obtained.

As is apparent from the above-mentioned Formula 2 and Formula 3, according to the method of the invention, the moisture was an important element. In other words, if the finishing agent contains moisture, the finishing agent cross-linked before reacting a surface of the substrate. Consequently, the reaction at the interface between solid and liquid was interrupted so that an chemically adsorbed film was not easily formed. Therefore, it is important that the moisture in the finishing agent is kept as small as possible. The moisture content in the composition was preferably not more than 10 ppm.

Stable chemical adsorbed overcoat was obtained by using the metal carboxylate or metal carboxylate chelate as a silanol condensing catalyst. The preferable content of the silanol condensing catalyst was 0.1–50 wt. %. In order to generate merely dealcohol reaction by the use of alkoxy group, inorganic acid or organic acid can be used. However, as mentioned above, it is not preferable that the finishing agent contains moisture. Therefore, it is preferable that the catalyst used for the first finishing agent is a silanol condensing catalyst.

EXAMPLE 2

The following finishing agent was prepared and examined in a same manner as in Example 1.

| | |
|---|---|
| (1) n-paraffin (bp. 180° C.) | 20 g |
| (2) silicone oil (Shinetsu Kagaku Kogyo, KF-96, 1000 cps) | 10 g |
| (3) paraffin (Kanto Kagaku, mp. 86° C.) | 15 g |
| (4) heptadecafluorodecyl-trimethoxysilane $(CF_3(CF_2)_7\text{-}(CH_2)_2\text{-}Si(OC_2H_5)_3)$ | 10 g |
| (5) calcium carbonate (abrasive materials: average particle size is 1 μm) | 15 g |

Moreover, dibutyl tin acetate microencapsuled with formalin condensed resin (3 g) was added into the above-mentioned agents and stirred so that soft wax finishing agent was made.

This finishing agent had the high fluidity. However, the same result as in Example 1 except that white overcoat was provided after the finishing agent was applied to the glass substrate and let the glass sit thereon for 20–30 minutes. The results are shown in Table 1.

EXAMPLE 3

The same experiment as in Example 2 was employed in this example except that heptadecafluorodecyl trimethoxysilane used in Example 2 was replaced with tridecafluorooctyl triethoxysilane $(CF_3(CF_2)_5(CH_2)_2\text{—}Si(OC_2H_5)_3)$. The results are shown in Table 1.

EXAMPLE 4

The same experiment as in Example 2 was employed except that the glass used in Example 2 was replaced with a rear view mirror and that 2 grams of dibutyl tin bis-acetyl acetate was not microencapsuled. The results are shown in Table 1. The pot-life of this agent was approximately is 8 months.

EXAMPLE 5

The same experiment as in Example 2 was employed except that the glass used in Example 2 was replaced with a bonnet of an automobile and that 5 grams of ethanol, as an aqueous solvent, was further added. The results are shown in Table 1. This finishing agent was usable for a few hours after preparation but was solidified and unusable in 2 or 3 days.

EXAMPLE 6

The same experiment as in Example 2 was employed except that the glass used in Example 2 was replaced with an urethane bumper. The results are shown in Table 1.

EXAMPLE 7

The same experiment as in Example 2 was employed except that the alpha-alumina used in Example 2 was replaced with silica (average particle size is 5 μm) The results are shown in Table 1.

EXAMPLE 8

The same experiment as in Example 1 was employed except that the amount of n-paraffin was 40 g. The viscosity of the prepared liquid wax was about 3000 to 4000 cps. The results are shown in Table 1.

EXAMPLE 9

The same experiment as in Example 1 was employed except that the moisture content was further added in the amount of 5wt. %. In this case, if the prepared liquid was used right after the preparation, the same result as Example 4 was obtained. The results are shown in Table 1. However, this prepared liquid was solidified for one night and could not be used.

Reference 1

The same experiment as in Example 1 was employed except that microencapsuled dibutyl tin dilaurate was removed. The results are shown in Table 1. If silanol condensing catalyst was not included like this Reference, the formed overcoat hardly had durability.

Reference 2

The same experiment as in Example 2 was employed except that microencapsuled dibutyl tin bis-acetyl acetate was removed. The results are shown in Table 1. Same as Reference 1, the formed overcoat hardly had durability.

TABLE 1

| | Contact Angle of Water (°) | | Contact Angle of Oil (°) | |
|---|---|---|---|---|
| | Initial Number | After Rubbing Test | Initial Number | After Rubbing Test |
| Example 1 | 115 | 116 | 98 | 96 |
| Example 2 | 114 | 113 | 96 | 94 |
| Example 3 | 118 | 115 | 97 | 91 |
| Example 4 | 113 | 111 | 91 | 92 |
| Example 5 | 105 | 100 | 93 | 81 |
| Example 6 | 118 | 105 | 95 | 82 |
| Example 7 | 114 | 109 | 95 | 88 |
| Example 8 | 116 | 111 | 92 | 94 |
| Example 9 | 109 | 105 | 91 | 86 |
| Reference 1 | 99 | 48 | 61 | 24 |
| Reference 2 | 87 | 47 | 45 | 16 |

As clearly seen from Table 1, the substrate treated with a finishing agent of the Example maintained its water and oil repellancy properties even after the surface was rubbed repeatedly with a wet cloth. In Reference 1 and Reference 2, water and oil repellancy properties were low and the properties were almost completely nonexistant after the test.

EXAMPLE 10

Soft solid wax was prepared in the following procedures:

mixing the following materials;

| | |
|---|---|
| (1) n-paraffin (bp. 210° C.) | 20 g |
| (2) isopropyl alcohol | 5 g |
| (3) silicone oil (Shinetsu Kagaku Kogyo, KF-96, 1000 cps) as a paraffin-based wax | 5 g |
| (4) paraffin (Kanto Kagaku, mp. 94–96° C.) | 20 g |
| (5) heptadecafluorodecyl trimethoxysilane ($CF_3(CF_2)_7$-$(CH_2)_2$-$Si(OCH_3)_3$) | 10 g |
| (6) alpha-alumina (average particle size is 1 μm) | 5 g | stirring the mixed material at 100° C., thus providing a suspension;

cooling the suspension down to a room temperature;

(7) adding the 10 grams of 3% sulfuric acid microencapsuled with formalin condensed resin as an acid catalyst and further stirring. Thus, a solid soft wax finishing agent having a viscosity of 2500 cps was provided. The 3% sulfuric acid was encapsuled in a way suggested in the above-mentioned publication. The water and oil repellent properties and durability of the finishing agent were examined by the use of a finishing agent by the following treatment.

As a substrate for the finishing agent, window glass of an automobile 1 was used. The surface of this glass substrate comprised a large number of —OH groups containing active hydrogen (FIG. 1(a)).

The glass substrate was cleaned thoroughly and then the prepared finishing agent was applied thereon by sponge as rubbing on the surface of the glass. Consequently, the surface of the glass was thinly abrasive-removed and cleaned by abrasive material (alphaalumina). Furthermore, the capsules of folmaline condensing resin were broken so that sulhuric acid and heptadecafluorodecyl trimethoxy silane were blended together and the blended agent contacted with surface of the cleaned glass. Then the finishing agent was allowed to sit in the air for 30–40 minutes so that n-paraffin was evaporated to form a white overcoat. At this time, at the interface of the overcoat and the substrate surface, even if silicone oil and paraffin were present, heptadecafluorodecyl trimethoxysilane 3 came in contact with glass substrate (FIG. 1(b)), and reacted to —OH groups 2 at the certain ratio in the presence of catalyst. At this time dealcohol reaction expressed in Formula 4 was proceeded so that heptadecafluorodecyl-trihydroxysilane surface active molecules were formed.

Formula 4

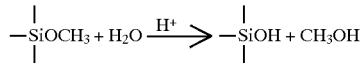

Moreover, a silanol group which was made in the reaction expressed in the above-mentioned formula, and active hydrogen of —OH group generated a dehydration reaction expressed in Formula 5. Consequently, heptadecafluorodecyl-trimethoxysilane surface active agent was chemically adsorbed and fixed to the surface of a substrate by a covalent bonding via SiO bonding.

Formula 5

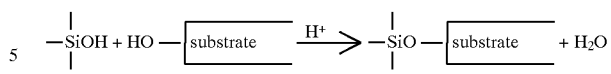

The excess unreacted agent was wiped off with a cloth, heptadecafluorodecyl trimethoxysilane molecules were fixed to the surface of a substrate by a network bonding via SiO bonding. The fluorocarbon-based adsorbed polymer film 4 (film thickness is 2–5 nm) was formed.

The film was not peeled off by a cross-cut adhesion test. The contact angle of water was 115°. In addition, the contact angle was hardly deteriorated after rubbed with a wet cloth 50000 times. Salad oil applied on the substrate surface was easily wiped off with tissue paper. The result is shown in Table 2.

In this example, the preservativity was obtained by microencapsuling the acid catalyst to be added and preventing self-reaction. The deterioration in preservation was mainly caused by the hydrolyzing reaction between the moisture and alkoxysilane surface active agent in the presence of acid catalyst. Therefore, in order to improve the preservativity, acid catalyst and alkoxysilane surface active agent should be prevented from mixing with each other. In other words, if one or both of alkoxysilane surface active agent and acid catalyst was microencapsuled when adding, the mixing can be avoided. Consequently, only acid catalyst is not required to be microencapsuled. Moreover, according to this example that acid catalyst and alkoxysilane surface active agent were mixed and the mixture contacted with the substrate surface. In other words, alkoxysilane and acid catalyst were reacted on the surface of a substrate, however, catalyst and surface active agent, if microencapsuled, were not mixed. In order to solve the problem, the pressure sensitive microcapsules were used. Consequently, finishing agent was applied to the substrate surface such that the microcapsules were broken.

Moreover, if the volatile acid such as hydrochloric acid and nitric acid or the like is used as the acid catalyst, it is preferable that calcium carbonate be added in an amount of 5–30 wt. %. As a result, excess volatile acid is trapped by the reaction between volatile acid and calcium carbonate, the acid odor can be prevented lower.

EXAMPLE 11

In this Example, calcium carbonate was added. The following materials were mixed to prepare the finishing agent and examined same as Example 10.

mixing the following materials in an Erlenmeyer flask;

| | |
|---|---|
| (1) n-paraffin (bp. 180° C.) | 20 g |
| (2) butyl alcohol | 4 g |
| (3) silicone oil (Shinetsu Kagaku Kogyo, KF-96, 1000 cps) | 3 g |
| (4) paraffin (Kanto Kagaku, mp. 86° C.) | 25 g |
| (5) calcium carbonate (average particle size is 1 μm. it is added as an abrasive materials or hydrochloric acid trapping agent.) | 15 g | stirring the mixed material at 100° C., thus providing a suspension;

cooling the suspension down to a room temperature;

(6) adding as an acid catalyst the 8 grams of 4% hydrochloric acid; and (7) 10 grams of heptadecafluorodecyltrimethoxysilane ($CF_3(CF_2)_7$—$(CH_2)_2$—$Si(OC_2H_5)_3$) microencapsuled with folmalin resin and stirring. Thus, solid soft wax finishing agent having viscosity of 4500 cps was provided. Heptadecafluorodecyltrimethoxysilane was encapsuled in the way suggested in the above-mentioned publication.

This finishing agent had high fluidity. However, the same experiment as in Example 10 was employed in this example except that a white overcoat was obtained after the finishing agent was applied to the glass substrate and allowed to sit for 20–30 minutes. The results are shown in Table 2.

EXAMPLE 12

The same experiment as in Example 10 was employed in this example except that heptadecafluorodecyltrimethoxysilane used in Example 10 was replaced with tridecafluorooctyltriethoxysilane $(CF_3(CF_2)_5(CH_2)_2-Si(OC_2H_5)_3)$. The results are shown in Table 2. When the glass was applied by this finishing agent, odor of hydrochloric acid was hardly recognized.

EXAMPLE 13

The same experiment as in Example 11 was employed except that the glass used in Example 11 was replaced with a rear view mirror. In this case, some odor of hydrochloric acid was recognized.

EXAMPLE 14

The same experiment as in Example 13 was employed except that the mirror used in Example 13 was replaced with a bonnet of an automobile and that an active alumina (15 g) was added instead of calcium carbonate used in Example 13. In this case, some odor of hydrochloric acid was recognized. The results are shown in Table 2.

EXAMPLE 15

The same experiment as in Example 11 was employed except that the glass used in Example 11 was replaced with an urethane bumper. The results are shown in Table 2.

EXAMPLE 16

The same experiment as in Example 10 was employed except that the alpha-alumina used in Example 10 was replaced with silica (average particle size is 5 μm). The results are shown in Table 2.

EXAMPLE 17

The same experiment as in Example 10 was employed except that the amount of n-paraffin was 40 g. The viscosity of the prepared liquid wax was about 3000 to 4000 cps. The results are shown in Table 2.

Reference 3

The same experiment as in Example 10 was employed except that microencapsuled sulfuric acid was removed. The results are shown in Table 2. Like this reference, if only alkoxysilane-based materials were used, formed overcoat had little durability.

Reference 4

The same experiment as in Example 11 was employed except that microencapsuled hydrochloric acid was removed. The results are shown in Table 2. Same as Reference 3, formed overcoat had little durability.

TABLE 2

|  | Contact Angle of Water (°) | | Contact Angle of Oil (°) | |
| --- | --- | --- | --- | --- |
|  | Initial Number | After Rubbing Test | Initial Number | After Rubbing Test |
| Example 10 | 115 | 116 | 98 | 96 |
| Example 11 | 114 | 113 | 95 | 94 |
| Example 12 | 116 | 114 | 96 | 92 |
| Example 13 | 113 | 111 | 95 | 93 |
| Example 14 | 111 | 108 | 99 | 89 |
| Example 15 | 113 | 104 | 95 | 87 |
| Example 16 | 113 | 108 | 96 | 88 |
| Example 17 | 116 | 111 | 92 | 94 |
| Reference 3 | 98 | 49 | 60 | 23 |
| Reference 4 | 89 | 47 | 45 | 16 |

As clearly seen from Table 2, the substrate treated with a finishing agent of the invention maintained its water and oil repelling properties even after the surface was rubbed repeatedly with a wet cloth. In Reference 3 and Reference 4, water and oil repelling properties were low and the properties were almost completely absent after the test.

As explained above, by the method of using a finishing agent of the invention, a polymer film can be formed by the use of active hydrogen on the substrate, thus efficiently forming an overcoat on a substrate materials such as plastic, ceramics, glass or the like. At this time, one or both of alkoxysilane surface active agent and acid catalyst was microencapsuled and added in the finishing agent so that pot life can be made for as long as the case that the above-mentioned agents are not microencapsuled. Moreover, if the volatile acid are used, it is preferable that the materials reacting to the acid is added. As a result, extra volatile acid is trapped by the reaction between volatile acid and the materials reacting to the acid. This can prevent an acid odor.

The method of the present invention can be used for such equipments as electronics products, electro domestic products, automobile, industrial equipments, mirrors, lenses for glasses and the like. Above-mentioned equipments need overcoating films which are not easy to get dirt, and have heat, weather, and abrasion resistance and also water and oil repellent properties.

The invention may be embodied in other specific forms without departing from the spirit or essential characteristics thereof. For example, an abrasive materials can be separately applied onto the surface of the substrate prior to the finishing agents. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A finishing agent comprising an alkoxysilane surface active agent, an acid catalyst and a liquid or solid medium, wherein at least one of the alkoxysilane surface active agent and the acid catalyst is microencapsuled.

2. The finishing agent according to claim 1, further comprising at least one abrasive material.

3. The finishing agent according to claim 1, further comprising calcium carbonate.

4. The finishing agent according to claim 1, wherein the viscosity of said liquid medium is not less than 1000 cps at 25° C..

5. The finishing agent according to claim 1, wherein said liquid or solid medium comprises a mixture of a medium having a boiling point of 200° C. or more and a medium having a boiling point of 100° C.–200° C.

6. The finishing agent according to claim 1, wherein said alkoxysilane surface active agent includes a fluorocarbon group.

7. The finishing agent according to claim 1, wherein said alkoxysilane surface active agent has the formula:

$$CF_3-(CF_2)_n-(R)_m-SiX_p(OA)_{3-p}$$

wherein n represents 0 or an integer; R represents an alkylene, vinylene, ethynylene, arylene group or a molecular chain comprising a silicon or oxygen atom; m represents 0 or 1; X represents H, an alkyl group, alkoxyl group or a molecular chain comprising fluoroalkyl or fluoroalkoxyl groups; A represents an alkyl group; and p represents 0, 1 or 2.

8. The finishing agent according to claim 2, wherein said abrasive material comprises at least one component selected from the group consisting of alumina, calcium oxide, calcium carbonate, silicon carbide, boron carbide, chromium oxide, iron oxide, synthetic diamond and fine-grain silica, and the component is particles smaller than 10 μm in diameter.

* * * * *